(12) United States Patent
Suleman et al.

(10) Patent No.: US 10,929,941 B1
(45) Date of Patent: Feb. 23, 2021

(54) CONTROLLED INCARCERATION RISK MITIGATION MECHANISMS FOR AT RISK CONSTITUENTS EMPLOYING CONTROLLED-ENVIRONMENT FACILITY COMMUNICATIONS SYSTEMS

(71) Applicant: Securus Technologies, Inc., Carrollton, TX (US)

(72) Inventors: Shuaib Suleman, Plano, TX (US); Adam Christopher Edwards, Fort Worth, TX (US)

(73) Assignee: Securus Technologies, LLC, Carrollton, TX (US)

( * ) Notice: Subject to any disclaimer, the term of this patent is extended or adjusted under 35 U.S.C. 154(b) by 35 days.

(21) Appl. No.: 16/360,870

(22) Filed: Mar. 21, 2019

(51) Int. Cl.
  *G06Q 50/26* (2012.01)
  *H04L 12/18* (2006.01)
  *H04M 3/38* (2006.01)

(52) U.S. Cl.
  CPC ......... *G06Q 50/26* (2013.01); *H04L 12/1818* (2013.01); *H04M 3/38* (2013.01)

(58) Field of Classification Search
  CPC ....... G06Q 50/26; H04L 12/1818; H04M 3/38
  See application file for complete search history.

(56) References Cited

U.S. PATENT DOCUMENTS

| | | | | |
|---|---|---|---|---|
| 7,805,457 B1* | 9/2010 | Viola | ..................... | G06Q 10/00 707/769 |
| 9,106,789 B1* | 8/2015 | Shipman, Jr. | .......... | H04N 7/147 |
| 9,769,310 B2 | 9/2017 | Hodge | | |
| 9,830,790 B2* | 11/2017 | Jones | ................ | G08B 13/19617 |
| 9,922,048 B1* | 3/2018 | Milliorn | ............. | G06K 9/00281 |
| 10,091,350 B2 | 10/2018 | Hodge | | |
| 2007/0285504 A1* | 12/2007 | Hesse | ....................... | H04N 7/15 348/14.08 |
| 2008/0201158 A1* | 8/2008 | Johnson | .................. | G10L 15/26 705/1.1 |
| 2011/0261941 A1* | 10/2011 | Walters | ................... | G10L 15/26 379/188 |
| 2014/0194084 A1* | 7/2014 | Noonan | ............... | H04B 17/318 455/404.1 |
| 2014/0267547 A1* | 9/2014 | Torgersrud | ............. | H04N 7/141 348/14.02 |

(Continued)

*Primary Examiner* — Mohamed A. Wasel
(74) *Attorney, Agent, or Firm* — Fogarty LLP

(57) ABSTRACT

The present systems and methods for incarceration risk mitigation for an at risk constituent may match, such as by a controlled-environment facility Administration and Management System (AMS), a non-resident constituent with a correctional facility inmate, based, at least in part on an offense committed by the non-resident constituent and a criminal offense committed by the correctional facility inmate. A controlled-environment facility visitation system, or the like, may then schedule a controlled-environment facility communication between the non-resident constituent and the correctional facility inmate. A controlled-environment facility communication processing system, or the like, may provide a communication link between the non-resident constituent and the correctional facility inmate, as scheduled. The AMS, or the like, may report participation for the non-resident constituent and/or the correctional facility inmate in the controlled-environment facility communication.

21 Claims, 3 Drawing Sheets

(56) References Cited

U.S. PATENT DOCUMENTS

| | | | | |
|---|---|---|---|---|
| 2014/0313275 A1* | 10/2014 | Gupta | ................... | H04N 7/141 |
| | | | | 348/14.06 |
| 2016/0117466 A1* | 4/2016 | Singh | ................... | G06Q 50/265 |
| | | | | 702/19 |
| 2017/0264739 A1* | 9/2017 | Smith | ................... | G10L 25/51 |

* cited by examiner

CONTROLLED INCARCERATION RISK MITIGATION MECHANISMS FOR AT RISK CONSTITUENTS EMPLOYING CONTROLLED-ENVIRONMENT FACILITY COMMUNICATIONS SYSTEMS

TECHNICAL FIELD

The present disclosure relates generally to controlled-environment facilities, and more particularly to incarceration risk mitigation mechanisms for at risk constituents, including student and other youths, and particularly to controlled incarceration risk mitigation mechanisms for at risk constituents employing controlled-environment facility communications.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel.

Systems and processes for mitigating incarceration risk for at risk constituents, such as youth (students), are typically limited to programs that employ public speaking by ex-convicts, youth deterrent programs (programs such as defensive driving classes, which show new drivers the dangers of poor driving and/or driving distracted, anger management, theft prevention, programs, etc.), community outreach programs, youth programs (such as Boys and Girls Club), prison tours (i.e. "Scared Straight").

Correctional facility inmates are typically allowed some contact with friends and family while incarcerated, in that the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," online chat sessions, email, text, and the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide mitigation of incarceration risk of an at risk constituent. Therein, a controlled-environment facility administration and management system, or the like, matches a non-resident constituent with a correctional facility inmate, based, at least in part on an offense committed by the non-resident constituent and a criminal offense committed by the inmate. A controlled-environment facility visitation system, or the like, schedules a controlled-environment facility communication between the non-resident constituent and the inmate, and a controlled-environment facility communication processing system, or the like, provides a communication link between the non-resident constituent and the inmate, as scheduled. The communication may be monitored and/or a respective user interface may offer one or both of the participants an option to immediately end the communication. The controlled-environment facility administration and management system, or the like, reports participation for the non-resident constituent and/or the correctional facility inmate in the controlled-environment facility communication.

The non-resident constituent may be a youth referred to participate in such a controlled-environment facility communication with an inmate. For example, the present system and/or method for mitigating incarceration risks for at risk constituents may be offered an institution and an indication of participation of the non-resident constituent therein may be accepted. In such cases participation of the non-resident constituent in the controlled-environment facility communication may be reported to such institution.

The aforementioned matching of an inmate with the non-resident constituent may also be further based, at least in part, on known inmate information, such as: the inmate's: criminal history, including details of criminal offenses committed and sentencing details; violations of correctional facility rules while incarcerated; recidivism rate; education background; education level; community service participation while incarcerated; one or more references; prison service provided; relevant religious status and/or affiliation; work history; race; gender; ethnicity; languages spoken; investigative history; and contraband-related concerns. To such ends, participation in the present systems and/or methods for mitigating incarceration risks for at risk constituents may be offered to inmates of one or more correctional facilities. Determining if a particular inmate is qualified to participate in the systems and/or methods, prior to, or as a part of matching the non-resident constituent with such an inmate may also be based, at least in part, on similar known inmate information. Further, reporting participation may include reporting participation of the matched inmate to the inmate's correctional facility.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
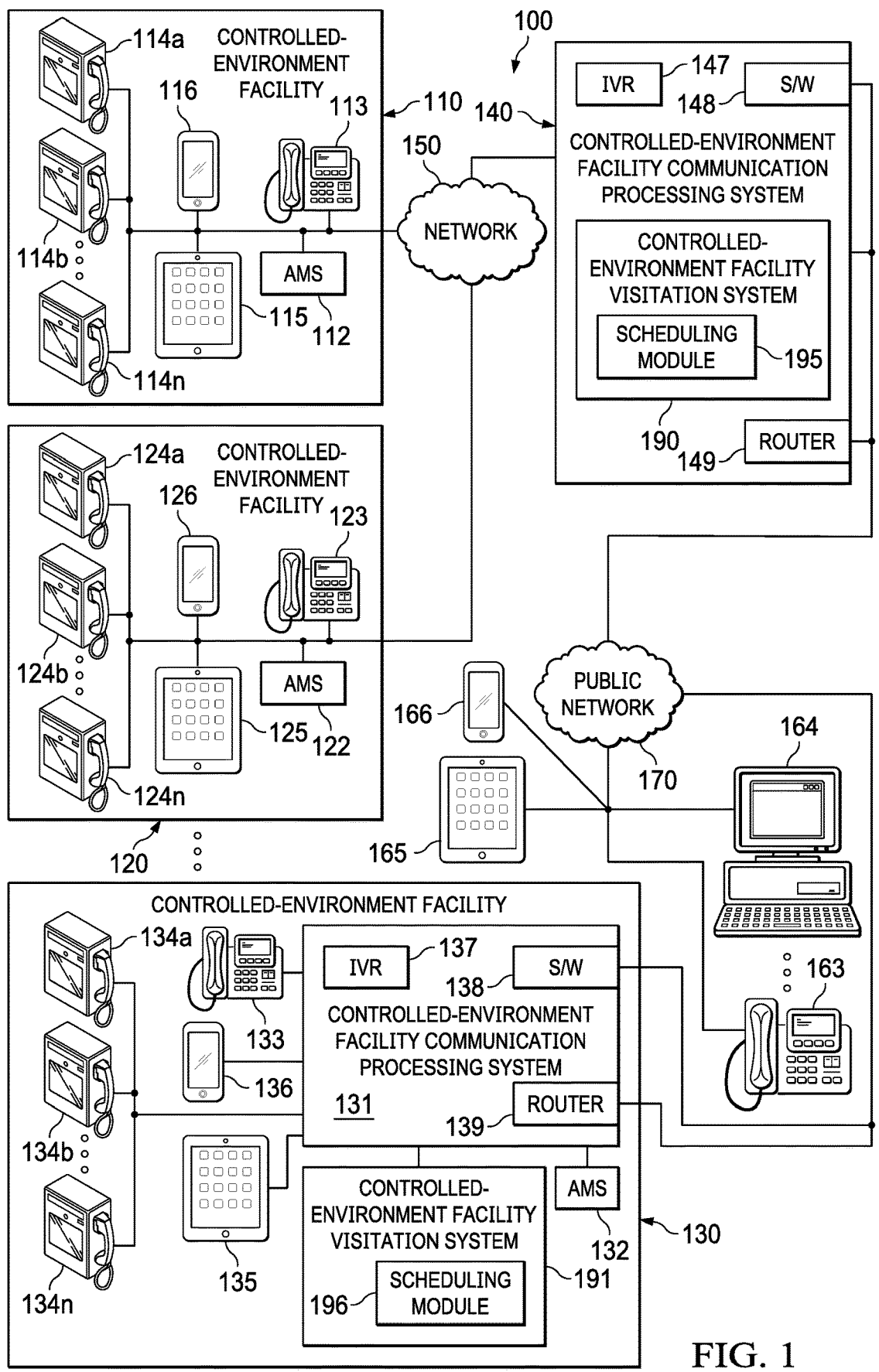
Figure 2:
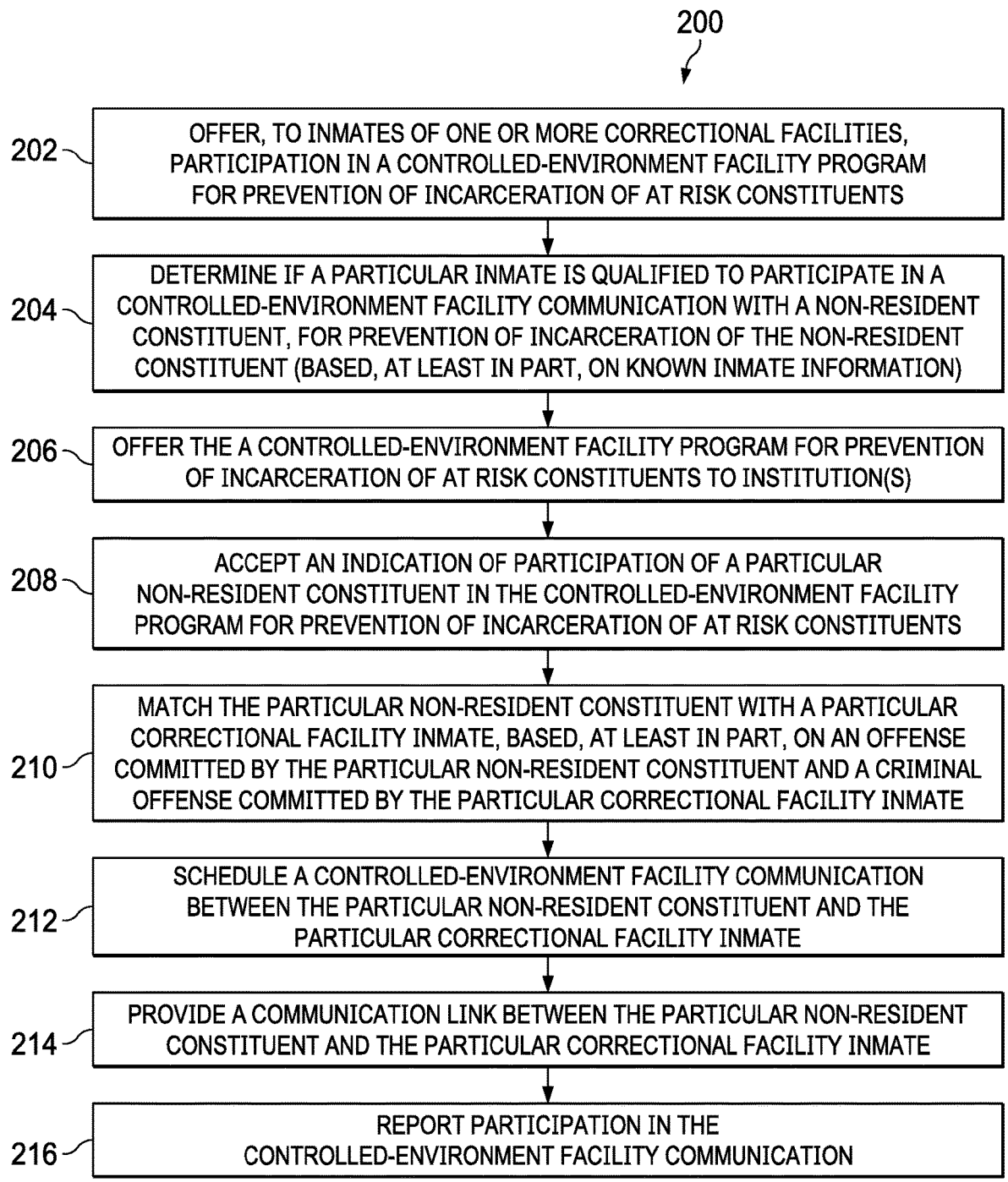
Figure 3:
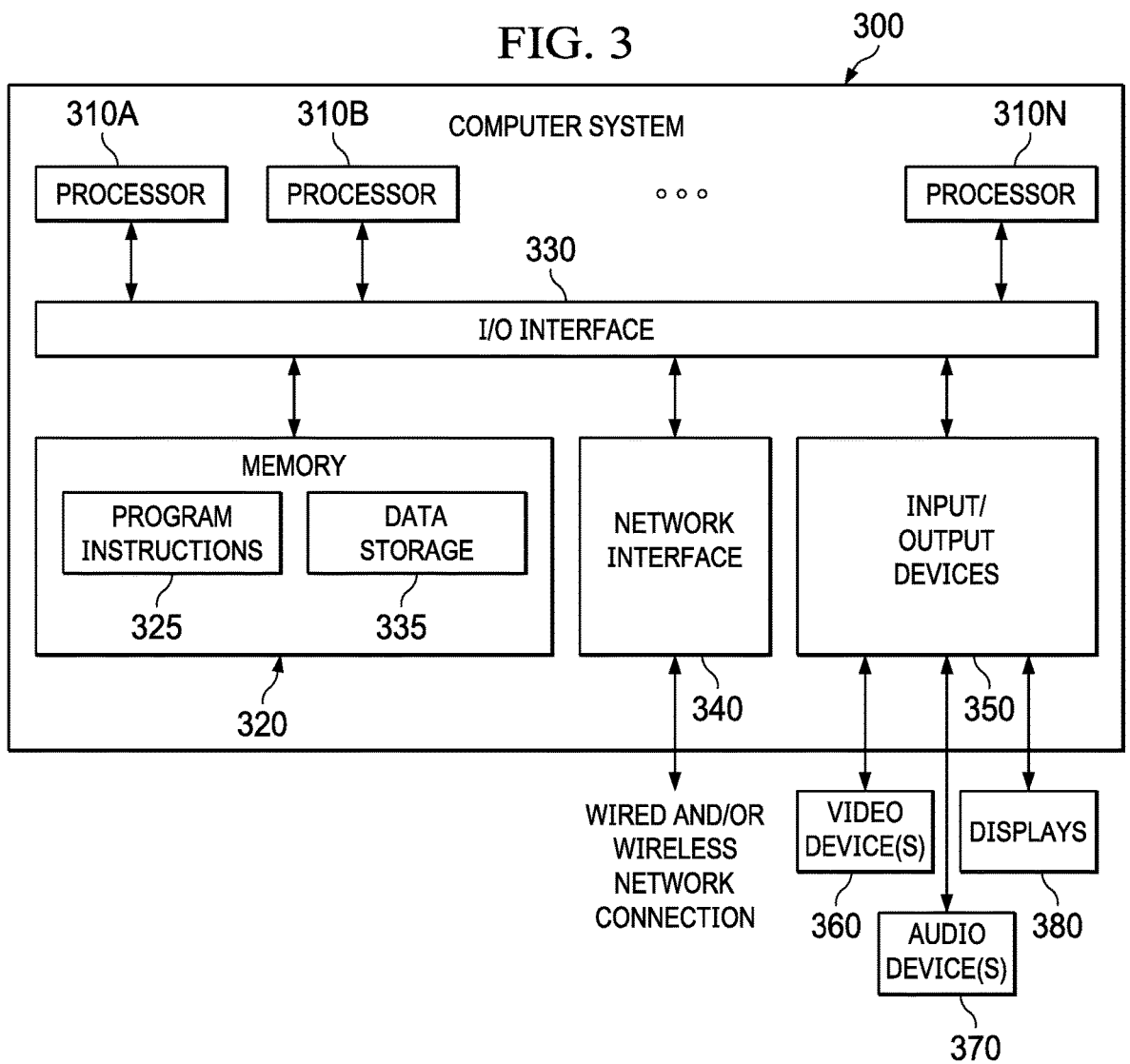

Having thus described the invention in general terms, reference will now be made to the accompanying drawings, which are not necessarily drawn to scale, and wherein:

FIG. 1 is a diagrammatic illustration of an example communications environment, wherein an example embodiment of the present systems and methods for mitigating incarceration risk for at risk constituents may be deployed, for example with respect to multiple controlled-environment facilities and/or a single controlled-environment facility, according to some embodiments;

FIG. 2 is a flowchart of an example process for controlled incarceration risk mitigation for at risk, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods generally relate to controlled-environment facilities and more particularly to incarceration risk mitigation mechanisms for at risk constituents, including students and other youth, and particularly to controlled incarceration risk mitigation mechanisms for at risk constituents employing controlled-environment facility communications, and the systems providing such communications. In accordance with embodiments of the present systems and methods for incarceration risk mitigation, an at risk a non-resident constituent is matched with a correctional facility inmate, based, at least in part on an offense committed by the non-resident constituent and a criminal offense committed by the inmate. A controlled-environment facility communication between the non-resident constituent and the inmate is scheduled and a communication link between the non-resident constituent and the correctional facility inmate is provided, as scheduled. Participation of the non-resident constituent and/or the correctional facility inmate in the controlled-environment facility communication is reported.

As noted, the present systems and methods are directed to controlled incarceration risk mitigation for at risk constituents. Embodiments of the present systems and methods allows the at risk student or other youth to communicate via a secure controlled-environment facility communications platform (in a voice, video or text communication) with an inmate to discuss life decisions and consequences of actions. In accordance with embodiments of the present systems and methods this inmate may be incarcerated for an infraction similar to, or otherwise related to an infraction the constituent (student or youth) is accused of or has been found guilty of. The methodology used by embodiments of the present systems and methods utilizes controlled assignments of an inmate with a specific line of criminal activity to a constituent at risk of committing (or who has committed) an offense along the same lines for one or more interventive discussions. Thereby, the present systems and methods may dissuade at-risk constituents from making poor life decisions by way of examining consequences directly from residents of a controlled-environment facility who have followed a path similar to the one the student or youth is upon prior to intervention in accordance with embodiments of the present systems and methods.

Embodiments of the present systems and methods may help to prevent future crimes as well as benefiting at risk students or other youths, local government, and participating inmates, such as trustee inmates. Additionally, embodiments of the present systems and methods may benefit a controlled-environment facility services provider, such as a controlled-environment facility communications services provider.

FIG. 1 is a diagrammatic illustration of example communications environment 100, wherein an example embodiment of the present systems and methods for mitigating incarceration risk for at risk constituents may be deployed, for example with respect to multiple controlled-environment facilities 110, 120, etc., and/or a single controlled-environment facility (130), according to some embodiments. Therein, onsite communication processing system 131, external centralized communication processing system 140, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated, a communication processing system (140), centrally or remotely located, in whole or in part, with respect to one or more controlled-environment facilities (110, 120, etc.), may be connected to such facilities via a public or private network (150) and provide communication services to such multiple controlled-environment facilities. More generally, however, it should be noted that communication systems 131, 140, etc. may assume a variety of forms, including telephony switches, such as electronic switching systems, or the like, and/or and may be configured to serve a variety of facilities and/or users, whether within or outside of a controlled-environment facility.

In some implementations, wherein the controlled-environment communication system (131) is located within the controlled-environment facility (130), it may have direct access to an Administration Management System (AMS) 132 (or a Jail Management System (JMS) in correctional environment embodiments) for garnering information used in accordance with various embodiments of the present systems and methods. In other embodiments, where the (central) controlled-environment facility communication system (140) is located remotely with respect to the controlled-environment facility (110, 120, etc.), access to AMS (or JMS) 112, 122, etc. may be obtained via a computer network such as, for example, network 150, for gathering information used in accordance with various embodiments of the present systems and methods.

In the context of a correctional facility, the respective JMS or AMS databases may also include information such as conviction data; criminal record; sentencing data, time served, time remaining to be served, and release date; balances for inmate trust and calling accounts; trial schedule; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates and/or for the selection of inmates to participate in the present systems and methods for mitigating incarceration risk for at risk constituents.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity).

In addition to providing certain visitation and communication operations, communication processing systems 131 and 140 may attempt to ensure that a resident's calls, video conferences, online chats, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 112, 122 or 132, or the like. In addition to PAN or PAC list(s), AMS (or JMS) 112, 122 or 132 (databases), or the like, may also store inmate or resident profile data (RPD), as well as visitation rules applicable to each inmate or resident, Communication Detail Records (CDRs), or similar records, for resident phone calls, video visitations, texts, online chats, or the like.

Residents may use more-or-less conventional telephones 113, 123, 133, or the like to access certain communication services, under control of respective communication processing system 131, 140, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use a video visitation device 114*a* through 114*n*, 124*a* through 124*n*, 134*a* through 134*n*, or the like, to place voice calls, as well as for video visitation, under control of respective communication processing system 131, 140, etc. Such a video visitation device may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents constituents, consistent with the present systems and methods, but, under control of respective communication processing system 131, 140, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what applications programs (apps) are provided or allowed on the IRD, and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates' transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like.

Under the control of communication processing system 131 and/or 140, etc. telephone 113, 123,133, etc. or IFD 114, 124, 134, etc. may be capable of connecting to a non-resident constituent's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switches 148, 138, etc. in respective communication processing system 131, 140, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 149, 139, etc., media gateway functionality, or the like of respective communication system 131, 140, etc. may be used to route data packets associated with a digital call connection, via an Integrated Services Digital Network (ISDN), the Internet, or the like (i.e. network 170). For example, a non-resident constituent may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident constituent's home, school, church, at a courthouse, on their person, or the like, consistent with embodiments of the present systems and methods. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

Visitation system 190, 191 may be configured to facilitate visitation sessions between a resident of a controlled-environment facility (inmate) and a non-resident (constituent). In various embodiments, visitation system 190, 191 may assume a variety of forms. For example, one or more components of controlled environment facility visitation system 190 may be centrally and/or remotely located with respect to one or more controlled-environment facilities 110, 120. In certain embodiments visitation system 190, 191 may be a component of, or otherwise associated with, a larger communications system that is utilized by controlled environment facilities, as depicted by visitation system 191 being associated with controlled-environment facility 130's communication processing system 131. In certain scenarios, such a communications system may provide residents with access to various visitation services, and facilitate scheduling of visitation, such as to implement aspects of the present systems and methods. For instance, a communications system may provide residents (inmates) with visitation services such as voice visitation services, video visitation services, email, online chats and/or messaging services, and scheduling thereof, which may be used in accordance with embodiments of the present systems and methods for conferring with at risk constituents.

Visitation system 190, 191 may be coupled to external networks such as the PSTN, Internet, or the like, 150, 170 such as through associated controlled-environment facility communication processing system 131, 140. Visitation system 190, 191 (as with controlled-environment facility communication processing system 131, 140) may include one or more gateways, telephony switches and/or telephony routers and may comprise (an) electronic switching system(s). Accordingly, visitation system 190, 191 may be configured to communicate with one or more residents of the controlled-environment facility via devices 125a, 125b, etc. and with one or more non-resident constituents via computing and/or communications devices 130a, 130b, 130c, 130d, etc., in accordance with embodiments of the present systems and methods.

In the illustrated embodiment, the visitation system 190, 191 includes scheduling module 195, 196, respectively, which in accordance with embodiments of the present systems and methods schedules visitations between a selected qualified inmate and an at risk non-resident constituent (youth). Thereby, visitation system 190, 191, or the like, may implement at least certain aspects of embodiments of the present systems and methods, such as through use of visitation schedule module 195, 196, or the like. Although not shown in FIG. 1, visitation system 190, 191 may additionally include, or be associated with, a visitation authentication module that processes identification authentication of non-residents and residents requesting and/or participating in visitation sessions. In certain embodiments, the authentication module may interface with visitation schedule module 195, 196 in order to determine if a requested visitation session has been properly scheduled and authorized. In certain embodiments, the visitation system 190, 191 may additionally utilize the visitation schedule module 195, 196 to enable non-residents constituents and inmate residents to access available capabilities for requesting and scheduling visitation sessions in accordance with embodiments of the present systems and methods.

The determination as to whether a particular inmate is qualified to participate in the present systems and methods for mitigating incarceration risks for at risk constituents may employ an inmate scoring system for program inclusion, such as may be employed by an inmate scoring engine, or the like, of visitation system 190, 191 and/or controlled-environment facility AMS(s) 112, 122, 132 and/or communications processing system 131, 140, etc.

In the embodiment of FIG. 1, visitation schedule module 195, 196 is shown as a component of the respective visitation system 190, 191. In certain embodiments, one or more of the described functions of the visitation system 190, 191, including functions of visitation schedule module 195, 196, may instead be provided by systems external to the visitation system 190, 191.

Regardless, in accordance with embodiments of the present systems and methods visitation systems 190, 191, such as through use of visitation scheduling module 195, 196, may be used to implement at least elements of processes for controlled incarceration risk mitigation for at risk constituents, employing controlled-environment facility communications, such as described below, with respect to FIG. 2.

FIG. 2 is a flowchart of example implementation 200 of a process to mitigate incarceration risk for at risk constituents, particularly at risk youth, in accordance with some embodiments. Therein, at 202, participation in the present process to mitigate incarceration risk for at risk constituents is offered to inmates of one or more controlled-environment facilities, and at 204, a determination is made whether a particular inmate applying to participate in process 200 is qualified to participate. That is, in accordance with embodiments of the present systems and methods participating inmates must meet qualifications (such as at 204) to talk to youth participants (for example inmates may be required to meet one or more certain thresholds, such as having obtained trustee status, or the like). Inmates participating in the present systems and methods may range in cause of incarceration, including convictions for offenses, or combinations of offences, related to drugs, rape, larceny, gang activity, theft, murder, brutality, assault, hate crimes, etc. Inmates may be rewarded for participation in the program in accordance with embodiments of the present systems and methods, such as by providing participating inmates a book, movie, or other media, and/or providing the inmate institutional rewards such as positive behavior rewards, notations of social service on their record, parole notations, etc. Inmates may, in accordance with various embodiments of the present systems and methods, volunteer, or may be discovered based on incarceration history. Embodiments of the present systems and methods may employ a "full" qualification check (such as at 204) to use only the "best" inmates, such as may be indicated by an inmate scoring system or method, in accordance with embodiments of the present systems and methods for mitigating incarceration risk for at risk constituents.

As noted, the determination at 204 as to whether a particular inmate is qualified to participate in the present systems and methods for mitigating incarceration risks for at risk constituents may employ an inmate scoring system for program inclusion. Such may be employed by an inmate scoring engine, or the like of the controlled environment facility communications processing system (131, 140), the controlled-environment facility AMSs (112, 122, 132); and/or the visitation system (190, 191). For example, a prospective inmate participant may be asked to complete a question and answer document. However, the answers to this question and answer document may be weighed against known inmate information, such as the inmate's: criminal history, including details of criminal offenses committed and sentencing details; further violations, such as while incarcerated; recidivism rate; education background and/or level; community service participation; reference(s); prison service provided; work history; investigative history, such as while incarcerated, or in addition to the criminal convictions for which sentence is being served; contraband-related concern; etc. Such objective data points, along with the answered questions, may be weighted and scored, resulting in a relative point count being given to the inmate(s) who volunteer to participate in the program. Active participation by a particular inmate may result from this "score" being above a certain point scale. The score can be affected by the performance in the program or outside the program (i.e. under the rules of the correctional facility) such as may be reported in accordance with the present systems and methods, as discussed below. The resulting score can be used to elevate inmate standing in hearings and for release applicability, as well as job prospects (within the facility and after release) in the future (along with historical hours of program service performed, etc.). In accordance with the above, embodiments of the present systems and methods represent and utilize inmates as assets.

At 206, process 200 for incarceration risk mitigation for at risk constituents is offered to one or more institutions, such as one or more courts, schools, churches, or similar institutions or directly to constituent families, such as the parent of an at risk youth, or the like. At 208, an indication of participation of a (non-resident) constituent in the process is received and accepted, such as from such an institution. For example, embodiments of the present systems and methods may gain access to at risk youth in a number of manners, such as: voluntary, for example through family, friends, school, church, etc.; via court order (e.g. a court may order employment of the present systems and methods by a youth convicted of a crime, which may be in addition to community service, or other sentencing); via school reprimand (such as, for fighting, stealing, bullying, drugs, inappropriate sexual behavior, lying, etc.); as a school, or other educational, requirement (e.g. a requirement in a particular class, as a requirement for all students (regardless of behavior), etc.; or the like. Additionally, or alternatively, embodiments of the present systems and methods may recognize at risk youth. In order to do so, such embodiments of the present systems and methods may: follow juvenile offenders and the like; follow school disciplinary reports; allow parents to engage embodiments of the present systems and methods and "self-report" children's behavior that may be addressed by embodiments of the present systems and methods; follow local court reporting data for at risk youth; and the like. Following juvenile offenders, and the like, may be implemented such as through a unique identifier tracked in an app, such as an app that the youth could log into, and, in some embodiments, a court could also log into, for results provided in accordance with the present systems and methods, as discussed below (at 216).

At 210, a participating inmate, qualified at 204, is matched with the constituent, based at least in part upon correlating an offense committed by the non-resident constituent (and for which the constituent is being referred) with a criminal offense committed by the participating inmate (whether or not that is the present offence for which the inmate is incarcerated). This assignment may be made in a "random" manner, in that the inmate may be selected, for each call in which the particular consentient is participating in, from a pool of inmates with criminal offenses along the line of the offence of which the constituent is being accused or has been convicted. Thereby, embodiments of the present systems and methods may employ a methodology to control assignments of an inmate with a specific line of criminal activity with a constituent at risk of committing (or who has committed) an offense along the same line for one or more interventive discussions. For example, as noted above, inmates participating in the present systems and methods may range in cause of incarceration, including convictions for offenses, or combinations of offences, related to drugs, rape, larceny, gang activity, theft, murder, brutality, assault, hate crimes, etc. Thus, in accordance with embodiments of the present systems and methods the matching at 210 may be made for similar crimes or offences committed by the non-resident constituent with a criminal offense committed by the participating inmate. Additionally, or alternatively, the match at 210 may be between a non-resident constituent that committed a "gateway" crime (even if just a gateway non-criminal "offense") with an inmate incarcerated for (or who has committed) a crime that such a gateway offense typically leads to (e.g. a youth accused of petty theft may be matched with a "career" thief, a youth caught with a firearm may be matched with an inmate who has committed a crime, such as manslaughter, with a firearm, etc.

Similar to inmate qualification at 204, known inmate information may be used in matching an inmate and constituent at 210. Such known inmate information may include the inmate's: criminal history, including details of criminal offenses committed and sentencing details; further violations, such as while incarcerated; recidivism rate; education background and/or level; community service participation; reference(s); prison service provided; relevant religious status and/or affiliation; work history; race; gender; ethnicity; languages spoken; investigative history, such as while incarcerated, or in addition to the criminal convictions for which sentence is being served; contraband-related concern; etc. For example, in accordance with various embodiments of the present systems and methods selections may be made to place constituents of similar or different backgrounds, religions, socioeconomic backgrounds, ethnicity, etc.

The constituent may be assigned an identification number, for use in all sessions involving the constituent, including session reporting, for other record keeping, etc. Also, the constituent may be given a nickname (alias) for use in (the) session(s). This constituent nickname may be associated with the constituent identification number. The inmate may be assigned an identification number for use in the present program, or another identification number associated with the inmate (i.e. an inmate number previously assigned by the correctional facility) may be used in accordance with embodiments of the present systems and methods. The inmate's identification number may likewise be used for record keeping and may be associated with a nickname given to inmate for use in session(s), etc. At this time, or thereabouts (i.e. at 208 above or 214 or 216, below) a session identification number may be assigned for the specific session.

Further, at this time, or thereabouts, a determination may be made in accordance with embodiments of the present systems and methods, how to document this meeting, such as in a manner that may be required by an agency referring the youth (court, school, etc.) and/or in a manner that may be required by the inmate's correctional facility, such as for purposes of insuring the inmate takes part in the meeting and/or is awarded any reward or recognition, such as described above, for such participation.

At 212, a controlled-environment facility visitation system (190, 191), or the like, schedules (such as by using scheduling module 195, 196) a controlled-environment facility communication between a non-resident constituent and a correctional facility inmate. Thereby, embodiments of the present systems and methods may allow the constituent (student or other youth) to schedule a telephonic or video visit, text exchange, or the like, which may be of a fixed duration, such as 30 minutes, with a (more or less) "random" qualified inmate, with experience (e.g. convictions) applicable to the youth's particular situation (e.g. accused or convicted offence(s)). The location and time and date of availability for the visit may be determined at such scheduling (at 212) in accordance with embodiments of the present systems and methods. For example, the location may be remote, with respect to the inmate's facility of incarceration, for the youth, while the inmate's location (i.e. location of the inmate's facility) may be geographically remote with respect to the youth. However, a geographically more local inmate, with respect to the youth, (matched at 210) may be more effective for communicating with the youth (e.g. an inmate who has a familiar accent, has knowledge of the youth's environment (city, town, neighborhood, etc.) may be able to more effectively influence the youth. Regardless, and moreover, caution must be exercised to avoid (such a "local") the inmate "grooming" or otherwise recruiting the youth in a criminal network (e.g. a gang, cartel, etc.) associated with the inmate.

Scheduling of a visit in accordance with embodiments of the present systems and methods at 212, may (additionally) involve determining what controlled-environment facility communications system may afford access by both the youth and selected inmate. Such scheduling may also involve determining who or what entity provisions (i.e. pays any costs associated with the meeting. For example, if the visit is carried out over a controlled-environment facility service provider's voice, video or data communication's system a cost may be incurred for the communication. In accordance with embodiments of the present systems and methods the entity referring the youth (i.e. the court, school, church, family member, friend, etc.) may be charged. Embodiments of the present systems and methods may be facilitated by such a controlled-environment facility communications service provider, free of charge, as a public service or as a service to the facility, or even to the inmate, such as in recognition of use and purchases of the service provider's communications services. Additionally, or alternatively, participating correctional facilities may pay for such communications services to facilitate the visit, as part of an inmate rehabilitation program, or the like.

At 214, a controlled-environment facility communication processing system (131, 140), or the like, establishes and maintains, or otherwise provides a communication link between the non-resident constituent and the correctional facility inmate.

In accordance with various embodiments of the present systems and methods the non-resident constituent may participate in the communication via a display device. In such embodiments, the non-resident constituent may be enabled to participate in the communication using a display device, such as a display device set (e.g. a television), a projector, monitor, or the like. In some embodiments, the non-resident constituent may control at least certain aspects of the communication session using a remote control associated with the display device. Further in accordance with such embodiments, an incoming multimedia communication signal may be provided to the display device at 214, such as through a cable or satellite receiver and an outgoing multimedia communication signal from the display device may be provided through the cable or satellite receiver. Alternatively, in such embodiments an incoming multimedia communication signal to the display device may be provided, at 214, through a streaming plug-in device coupled to or otherwise integrated into the display device and an outgoing multimedia communications signal from the display device may be provided through the streaming plug-in device, as well. In any case, the outgoing multimedia signal may include a video image of the non-resident constituent captured by a camera coupled to, or integrated into, the display device. Thereby, an aspect of a television programming available to the non-resident constituent may be based, at least in part, upon the controlled-environment facility communication session. The aspect may include, for example, a channel lineup, a channel ordering, or a television advertisement.

Embodiments of the present systems and methods may implement, and in accordance with some embodiments enforce, rules applicable to, or related to, the inmate, during the conversation. For example, no personal information may be revealed (e.g. use of nicknames may be assigned in accordance with embodiments of the present systems and methods given by the system). Cursing may be prohibited, gang affiliations, dates, places, locations, and the like may also be prohibited. No nudity is allowed under the present systems and methods. Discussions related to political influences may also be prohibited, in addition to specific details related to location, addresses, personal contacts, family members, places of interest, gang affiliation, etc., in general. The inmate may be guided to discuss life choices, which may also call for use of fictional, but still accurate and plausible, examples (i.e. without providing details about an actual crime).

Embodiments of the present systems and methods may also implement, and in accordance with some embodiments enforce, rules applicable to, or related to, the youth, during the conversation. For example, no cursing may be allowed, as well as no direct questions about the inmate's personal information or history. The present systems and methods forbid nudity and may forbid the youth from verbally abusing or insulting the inmate.

Embodiments of the present systems and methods may implement, and in accordance with some embodiments enforce, rules applicable to, or related to, the inmate and/or the youth by monitoring the conversation. Such monitoring may be carried out by facility, controlled-environment facility service provider, or other personnel, during the visit, or by reviewing a recording of the visit. However, in accordance with such embodiments of the present systems and methods, such monitoring may be automated in that speech recognition may be employed to determine if cursing is occurring, or forbidden information, such as participant identifies, the youth's address, or other such information as discussed above, is being disclosed, by the respective party. Image recognition may be used to determine if nudity is occurring in a video communication carried out in accordance with embodiments of the present systems and methods.

Monitoring of the communication session between the inmate and the constituent may be in the form of a "guarded exchange," which includes full monitoring and recording of text, voice, and visuals. A resulting recording may be offered to constituent (for a fee). Further, all sessions may be monitored live, and/or secondary review of a session (such as for investigative purposes) may be carried out, particularly for sessions where the "red button" discussed below is used.

Either user may have an ability to "red flag" the call, which may result in an alert being sent to controlled-environment facility personnel, or the like. In such cases, there may be a formal investigation of the visit which may lead to negative consequences. If the inmate or constituent commits multiple infractions, they could be removed from the program.

Additionally, "dual red button stop" may be available to the parties during the controlled-environment facility communication session, in a respective user interface. This may provide dual application of a "red button," available for constituent and inmate alike, as an option to immediately end and report the session for full investigation. A warning may be provided at the outset of the communication, and/or upon use of this "red button" to the effect that "use of this mechanism not to be taken lightly," and/or "fault could fall on both parties if any violations to rules are discerned. Activation of the "red button" (or other "red flagging" of the call) may, in accordance with embodiments of the present systems and methods, result in investigation by controlled-environment facility personnel, or the like, to discern fault (for session closure).

Furthermore, embodiments of the present systems and methods may enable a monitor to communicate with both or either party to warn or guide them to stay within the rules, (e.g., provide an admonishment to not curse) and/or to keep the conversation positive. Additionally, or alternatively, automated messages may pop up, which appear to be from such a live monitor, or which could be live monitor messages.

If it is determined session closure, or the like, was the fault of the inmate, a reprimand may be issued to the inmate, which may be facility specific or program specific. Additionally, or alternatively, an inmate "trustee score," or the like, may be adjusted and/or the inmate may be barred from the program (i.e. loss of inmate application to program in the future). A determination that closure of the session was the fault of the constituent may result in loss of credit for session, which may be reported (at 216). In the case of a court-ordered session, such issue(s) with non-conformity to the required session may result in possible jail time and/or fee's and cost incurred where applicable.

The session may (normally) conclude with a constituent survey, or the like. Such surveys may be of assistance in not only discerning basic approval or disapproval of the session, but also for improving the program and to assist in understanding concerns, as well as help determine whether constituents are receiving applicable intervention.

At 216, the controlled-environment facility visitation system (190, 191), the controlled-environment facility communication processing system (131, 140), and/or the like, reports participation, or in some embodiments, lack thereof, of the non-resident constituent and/or the correctional facility inmate in the controlled-environment facility communication between the non-resident constituent and the correctional facility inmate. Such reporting of participation by the non-resident constituent, or in some embodiments, lack thereof, at 216 may be made to the institution that referred the non-resident constituent at 208. Whereas, reporting participation by the particular inmate taking part in the controlled-environment facility communication with the non-resident constituent, or in some embodiments, lack thereof, may include reporting participation by the particular inmate at 216 to the particular inmate's correctional facility, for inclusion in the particular inmate's record, such as may be maintained by the AMS (112, 122, 132), or the like.

Such resulting reporting of each session may apply applicable specific identification numbers, confirmation numbers, and the like along with details regarding the involved inmate (including an inmate identification number, or the like), case requirements (such as may be required by a referring court, or the like), time, date, inmate facility, constituent details, session start time, session end time, and any issues with the session (if applicable). As noted, a session identification number may be assigned for each specific session. This session identification number may be associated with (used to identify) recording(s) and detail(s) within documentation for the specific session (such as may be reported at 216). As noted, session recordings can be made available to the constituent-referring party, such as the constituent's parent or guardian, a referring court, or other referring institution (e.g. school, church, etc.). However, for minor constitutes, such recording may only be provided with parent or guardian acknowledgment and consent, particularly to a referring institution such as a school, church, etc.

To document the meeting, such as discussed above with respect to 216, one or more meeting reports may be generated. In such cases, a determination may be made, or instructions may be followed, as to who may see such a report. For example, a determination may be made, or the instructions to be followed, may indicate whether the student is allowed to view a recording of the visit, whether a parent, school, or other referring entity is allowed to, etc. Further, a determination may be made, or instructions may be followed, as to what is included in a report. Similarly, a determination may be made, or instructions may be followed, as to how to document to inmate file, so as, for example, to provide or otherwise notate an inmate service record, such as for purposes described above.

As noted above an app that the youth, and/or a referring court, can log into may be used to access such results reported at 216. The app, other reports or reporting mechanisms, may state status, such as, complete/non-complete/in progress. Consistent with the above, the youth may also be enabled to write notes in the app to provide feedback, such as whether the program works, what could be improved, how it helped him/her, etc. Such feedback may only be identified by a number, or the like, and not a name, associated for security purposes. Also, a notes section may be provided in this tracking app that compiles notes taken by the aforementioned monitor(s) to provide further light on the interactions. Any communications from or to such an app may also, in accordance with various embodiments of the present systems and methods, be secure and encrypted.

In accordance with the foregoing, embodiments of the present systems and methods may provide multiple lines of benefit to help protect, guide, develop, and inform our youth, thereby providing benefits to children or young adults at risk of (eventually) becoming imprisoned. In accordance with embodiments of the present systems and methods, teens and young adults can actively engage with an inmate to discuss life "on the other side of the fence." Embodiments of the present systems and methods may, over time, provide measurable social impact for a specific locality (city or state). As noted, embodiments of the present systems and methods may employ inmate rewards, based on time and effort given to social programs and/or inmates may, in accordance with participation in the present systems and methods, actively help protect youth by dissuading them from actively engaging in detrimental life decisions. Historical data shows most incarcerated individuals: begin crossing (legal) "lines" at a young age and become victims of their own decisions, usually not, at least entirely, of their own accord. Since young people are predisposed to press limits, unfortunate individuals often end up with criminal records before reaching maturity. This may result in a hindrance that follows them through adulthood and "one more" wrong move gets them implanted in the corrections system. The results of which, "keeps them down" for the rest of their liar s. Typically, convicted felons cannot vote, have issues finding work, they cannot keep and maintain a family easily, etc.

Embodiments of the present systems and methods for controlled incarceration risk mitigation for at risk constituents employing controlled-environment facility communications systems, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIGS. 1 and 2, and/or a computer system such as computer system 300 may be used as part of, one or more of: controlled environment facility communications processing systems 131 and/or 140; AMSs 112, 122 and 132; visitation system 190 and/or 191, including visitation module 195 and/or 196; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via a network. For example, in FIG. 1, communication is shown, via public network 150 and/or network 170, which may be the Internet, or the like, as discussed above.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for mitigating incarceration risk of an at risk constituent, the system comprising:
    a controlled-environment facility visitation system comprising a processor and a memory coupled to the processor for storing program instructions, that upon execution by the processor of the controlled-environment facility visitation system, cause the controlled-environment facility visitation system to, schedule a controlled-environment facility communication between a non-resident constituent and a correctional facility inmate;
    a controlled-environment facility communication processing system comprising a processor and a memory couple to the processor for storing program instructions, that upon execution by the processor of the controlled-environment facility communication processing system cause the controlled-environment facility communication processing system to provide a communication link between the non-resident constituent and the correctional facility inmate; and
    a controlled-environment facility administration and management system comprising a processor and a memory coupled to the processor for storing program instructions for execution by the processor, the program instructions of the controlled-environment facility administration and management system, upon execution by the processor of the controlled-environment facility administration and management system, cause the controlled-environment facility administration and management system to:
        match, prior to scheduling the controlled-environment facility communication and/or providing the communication link, the non-resident constituent with the correctional facility inmate, based, at least in part on an offense committed by the non-resident constituent and a criminal offense committed by the correctional facility inmate; and
        report participation for at least one of the non-resident constituent and the correctional facility inmate in the controlled-environment facility communication.

2. The system of claim 1, wherein the non-resident constituent is a youth referred to participate in the controlled-environment facility communication.

3. The system of claim 1, wherein the program instructions of the controlled-environment facility administration and management system further cause the controlled-environment facility administration and management system to match the non-resident constituent with the correctional facility inmate, further based, at least in part, on known inmate information.

4. The system of claim 3, wherein the known inmate information, includes one or more of:
    the inmate's: criminal history, including details of criminal offenses committed and sentencing details;
    violations of correctional facility rules while incarcerated;
    recidivism rate;
    education background;
    education level;
    community service participation while incarcerated;
    one or more references;
    prison service provided;
    relevant religious status and/or affiliation;
    work history;
    race;
    gender;
    ethnicity;
    languages spoken;
    investigative history; and
    contraband-related concerns.

5. The system of claim 1, wherein the program instructions further cause the controlled-environment facility administration and management system, the controlled-environment facility visitation system and/or the controlled-environment facility communication processing system to accept, from an institution, an indication of participation of the non-resident constituent in the controlled-environment facility communication, prior to matching the non-resident constituent with the correctional facility inmate, and wherein reporting participation comprises reporting participation of the non-resident constituent in the controlled-environment facility communication between the non-resident constituent and the correctional facility inmate, to the institution.

6. The system of claim 1, wherein the program instructions further cause the controlled-environment facility administration and management system, the controlled-environment facility visitation system and/or the controlled-environment facility communication processing system to determine if a particular inmate is qualified to participate in the controlled-environment facility communication, prior to, or as part of matching the non-resident constituent with the correctional facility inmate, and wherein reporting participation comprises reporting participation of the particular inmate in the controlled-environment facility communication between the non-resident constituent and the correctional facility inmate, to the correctional facility.

7. The system of claim 6, wherein determining if the particular inmate is qualified to participate in the controlled-environment facility communication is based, at least in part, on known inmate information.

8. The system of claim 7, wherein the known inmate information, includes one or more of:
- the inmate's: criminal history, including details of criminal offenses committed and sentencing details;
- violations of correctional facility rules while incarcerated;
- recidivism rate;
- education background;
- education level;
- community service participation while incarcerated;
- one or more references;
- prison service provided;
- relevant religious status and/or affiliation;
- work history;
- investigative history; and
- contraband-related concerns.

9. The system of claim 1, wherein the program instructions further cause the controlled-environment facility administration and management system, the controlled-environment facility visitation system and/or the controlled-environment facility communication processing system to monitor the controlled-environment facility communication between the non-resident constituent and the correctional facility inmate.

10. The system of claim 1, wherein the program instructions further cause the controlled-environment facility communication processing system to present, in a respective user interface, an option to each of the non-resident constituent and the correctional facility inmate, during the controlled-environment facility communication, to immediately end the controlled-environment facility communication between the non-resident constituent and the correctional facility inmate.

11. A method for incarceration risk mitigation for an at risk constituent comprising:
- matching, by a controlled-environment facility administration and management system, a non-resident constituent with a correctional facility inmate, based, at least in part on an offense committed by the non-resident constituent and a criminal offense committed by the correctional facility inmate;
- scheduling, by a controlled-environment facility visitation system, a controlled-environment facility communication between the non-resident constituent and the correctional facility inmate;
- providing, by a controlled-environment facility communication processing system, a communication link between the non-resident constituent and the correctional facility inmate; and
- reporting, by the controlled-environment facility administration and management system, participation for at least one of the non-resident constituent and the correctional facility inmate in the controlled-environment facility communication.

12. The method of claim 11, wherein the non-resident constituent is a youth referred to participate in the method for incarceration risk mitigation for an at risk constituent.

13. The method of claim 11, wherein matching the non-resident constituent with the correctional facility inmate, is further based, at least in part, on known inmate information.

14. The method of claim 13, wherein the known inmate information, includes one or more of:
- the inmate's: criminal history, including details of criminal offenses committed and sentencing details;
- violations of correctional facility rules while incarcerated;
- recidivism rate;
- education background;
- education level;
- community service participation while incarcerated;
- one or more references;
- prison service provided;
- relevant religious status and/or affiliation;
- work history;
- race;
- gender;
- ethnicity;
- languages spoken;
- investigative history; and
- contraband-related concerns.

15. The method of claim 11, further comprising offering the method to an institution and accepting an indication of participation of the non-resident constituent in the method from the institution, prior to matching the non-resident constituent with the correctional facility inmate, and wherein reporting participation comprises reporting participation of the non-resident constituent in the controlled-environment facility communication between the non-resident constituent and the correctional facility inmate, to the institution.

16. The method of claim 11, further comprising offering the method to inmates of the correctional facility and determining if a particular inmate is qualified to participate in the method for incarceration risk mitigation, prior to, or as a part of matching the non-resident constituent with the correctional facility inmate, and wherein reporting participation comprises reporting participation of the particular inmate in the controlled-environment facility communication between the non-resident constituent and the correctional facility inmate, to the correctional facility.

17. The method of claim 16, wherein determining if the particular inmate is qualified to participate in the controlled-environment facility communication is based, at least in part, on known inmate information.

18. The method of claim 11, wherein the known inmate information, includes one or more of:
- the inmate's: criminal history, including details of criminal offenses committed and sentencing details;
- violations of correctional facility rules while incarcerated;
- recidivism rate;
- education background;
- education level;
- community service participation while incarcerated;
- one or more references;
- prison service provided;
- relevant religious status and/or affiliation;
- work history;
- investigative history; and
- contraband-related concerns.

19. The method of claim 11, further comprising monitoring the controlled-environment facility communication between the non-resident constituent and the correctional facility inmate.

20. The method of claim 11, further comprising presenting, in a respective user interface, an option to each of the non-resident constituent and the correctional facility inmate, during the controlled-environment facility communication, to immediately end the controlled-environment facility communication between the non-resident constituent and the correctional facility inmate.

21. A computer readable non-transitory medium having program instructions stored thereon that upon execution by one or more of a controlled-environment facility visitation system, a controlled-environment facility communication processing system and controlled-environment facility administration and management system, cause the respective controlled-environment facility visitation system, controlled-environment facility communication processing system and/or controlled-environment facility administration and management system to:
  match a non-resident constituent with a correctional facility inmate, based, at least in part on an offense committed by the non-resident constituent and a criminal offense committed by the correctional facility inmate;
  schedule a controlled-environment facility communication between the non-resident constituent and the correctional facility inmate;
  provide a communication link between the non-resident constituent and the correctional facility inmate; and
  report participation for at least one of the non-resident constituent and the correctional facility inmate in the controlled-environment facility communication.

* * * * *